United States Patent [19]
Freise

[11] Patent Number: 4,782,941
[45] Date of Patent: Nov. 8, 1988

[54] CLEANING RECEPTACLE FOR SPECTACLES

[76] Inventor: Siegfried Freise, Wilhelmvon Miller-Weg 8, D-8100 Garmisch-Partenkirchen/Upper Bavaria, Fed. Rep. of Germany

[21] Appl. No.: 5,936

[22] Filed: Jan. 22, 1987

[30] Foreign Application Priority Data

Jan. 23, 1986 [DE] Fed. Rep. of Germany ... 8601566[U]

[51] Int. Cl.$^4$ .............................................. B65D 81/22
[52] U.S. Cl. ........................................ 206/5; 134/117; 134/201; 206/205; 215/231
[58] Field of Search ...................... 68/213; 134/42, 117, 134/201; 206/5, 205, 591–594; 215/227, 228, 231; 422/300, 301

[56] References Cited

U.S. PATENT DOCUMENTS

| | | | |
|---|---|---|---|
| 1,562,348 | 11/1925 | Lockery | 422/301 |
| 1,912,627 | 6/1933 | Dyer | 134/117 |
| 2,177,504 | 10/1939 | Thompson | 215/227 |
| 3,038,593 | 6/1962 | Root et al. | 206/5 R |
| 4,279,351 | 7/1981 | Vertes | 215/231 |

FOREIGN PATENT DOCUMENTS

| | | | |
|---|---|---|---|
| 0451051 | 4/1913 | France | 422/301 |
| 1533983 | 7/1968 | France | 215/231 |
| 0254506 | 7/1926 | United Kingdom | 206/5 |

*Primary Examiner*—Jimmy G. Foster
*Attorney, Agent, or Firm*—Penrose Lucas Albright; Robert A. Miller

[57] ABSTRACT

For intensive cleaning of both lenses and frames of glasses, a cleaning vessel is provided having a cover which sealingly contains a cleaning fluid for receiving the glasses. A holder provided in the vessel for retaining different lengths of spectacles so they are centered in the vessel. The holder may be secured to the underside of the cover or in the bottom of the vessel or there may be holders in both locations. The holders are cupped outwardly relative to the interior of the vessel and centrally disposed to retain the spectacles permanently away from the sides of the vessel. The holders may be composed of a resilient material, cage-shaped or may be bellows so as to be self-adjustable for different sizes of spectacles. For different purposes, the vessels may be circular or oval in cross-section or have sides which as seen in cross-section, coincide with the outer peripheries of crossed ovals. Oval cross-sections may be provided with channels (or pocket shaped additional space) projecting outwardly and longitudinally along one or both of the wider sides.

15 Claims, 2 Drawing Sheets

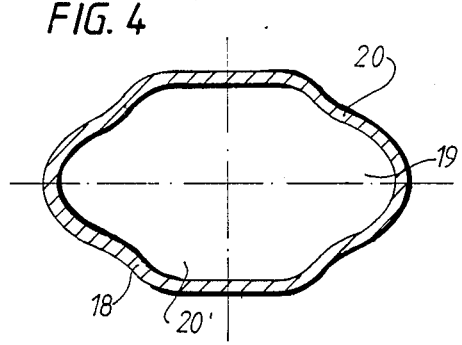
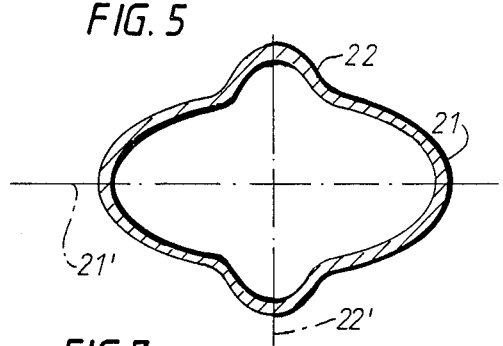
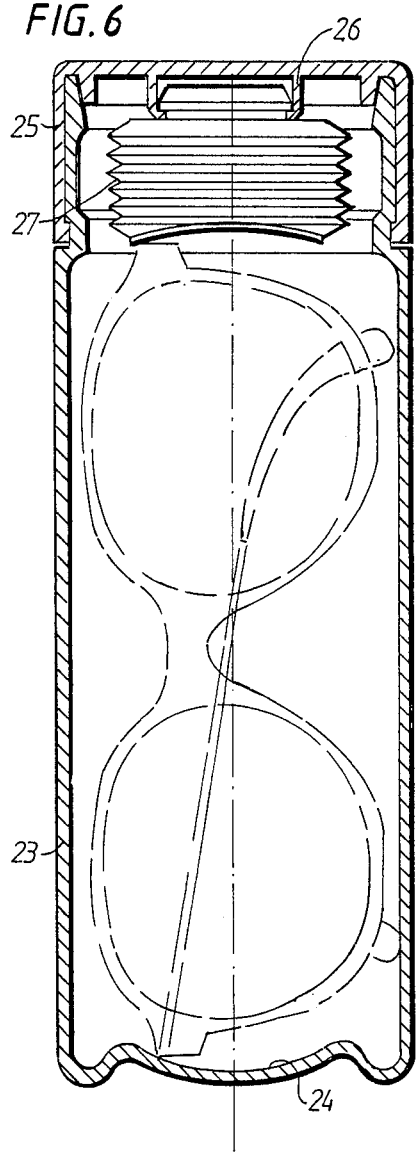
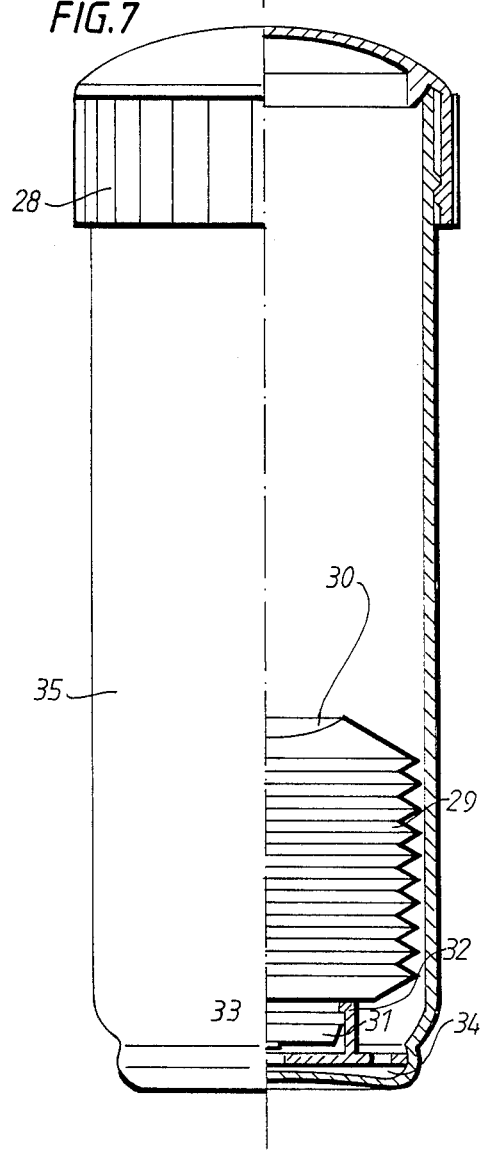

CLEANING RECEPTACLE FOR SPECTACLES

BACKGROUND AND SUMMARY OF THE INVENTION

The visibility coefficient of spectacles can be adversely affected by lenses which have been smudged from any one or a combination of different causes, for instance by the glasses being placed on dirty surfaces, by the lenses being touched with the fingers, by dirt particles in the air collecting on the lenses, and so forth. The traditional method of cleaning lenses by wiping them with a cloth, especially if there is grease or streaks or smudges of dirt, often proves inefficient. Plastic lenses and/or nonreflective lenses are particularly sensitive in this regard.

The invention relates to a method for continuous cleaning of lenses in a receptacle in which a pair of glasses can be placed so that, when not in use, they are continuously exposed to a dirt-dissolving cleaning fluid, even though this may be for an extended period of time. Known cleaning receptacles, e.g. as in DE-AS No. 30 02 717, are complicated structures, are expensive and susceptible to various problems, and thus are unsuitable for private use. Also, if very expensive and delicate spectacles are often placed in them, both the lenses and the frame may be damaged. On the other hand, the cleaning receptacle according to the invention wherein the glasses are retained centered therein is a relatively simple device which is easy to manufacture, and the spectacles are undamaged during cleaning, even if the receptacle is shaken.

Several embodiments of the invention are shown in and described with reference to the following Figures:

BRIEF DESCRIPTION OF THE DRAWINGS

FIGS. 4 and 5 illustrate other embodiments of horizontal sections of a cleaning receptacle according to the invention; and FIGS. 6 and 7 depict yet further modified embodiments in vertical and partial vertical section respectively.

DESCRIPTION OF THE PREFERRED EMBODIMENTS

Figure 1:
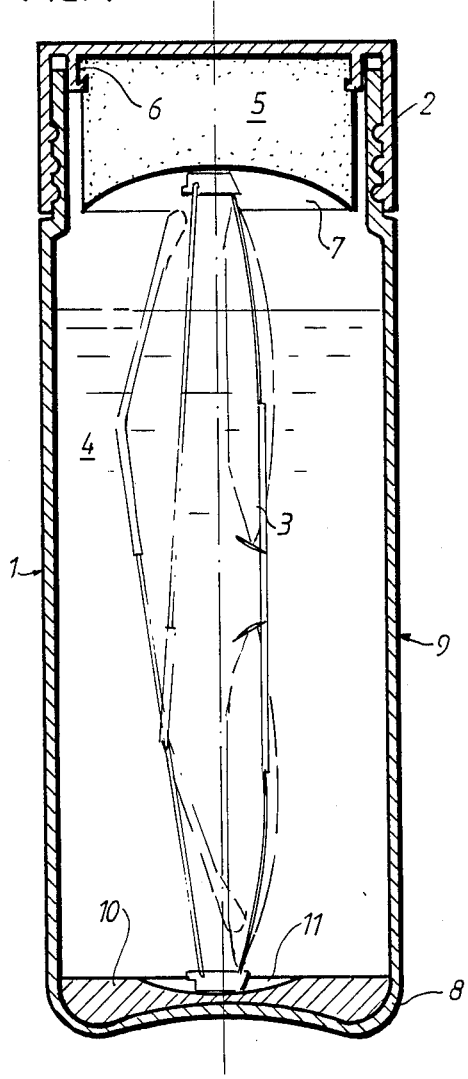
FIG. 1 is a vertical cross-section through a cleaning receptacle according to the invention in somewhat reduced scale.

In FIG. 1, a cleaning vessel 1 is sealed by a screw-on cover 2 and, when closed, carries spectacles 3 to be cleaned. It contains a cleaning fluid 4. Vessel 1 and cover 2 are preferably composed of a suitable plastic which can be manufactured by blow and/or injection and/or drawing processes.

A holder 5, retained by an annular fillet 6 formed in cover 2, is disposed in the upper aspect of vessel 1. It forms an integral component part of cover 2 and consists of a foam cylinder. The lower side 7 of holder 5, facing downward towards the spectacles, is concave or cup-shaped so that it better holds spectacles 3 axially in container 9 and urges or holds them away from the sides of vessel 1 when cover 2 is being screwed on. For the same purpose, an insert 10 is secured in the bottom 8 of container 9 with a concave or cup-shaped recess 11 turned toward the spectacles. Thus the spectacles 3 are held firmly, but gently, between holder 5 and a further holder or insert 10 in the position shown during the cleaning process and the delicate lenses do not engage the walls of container 9. One of the two holders (5 and 10) may advantageously be of a rubber, or other appropriate elastic, flexible material, to adapt to different sizes of spectacles.

Figure 2:
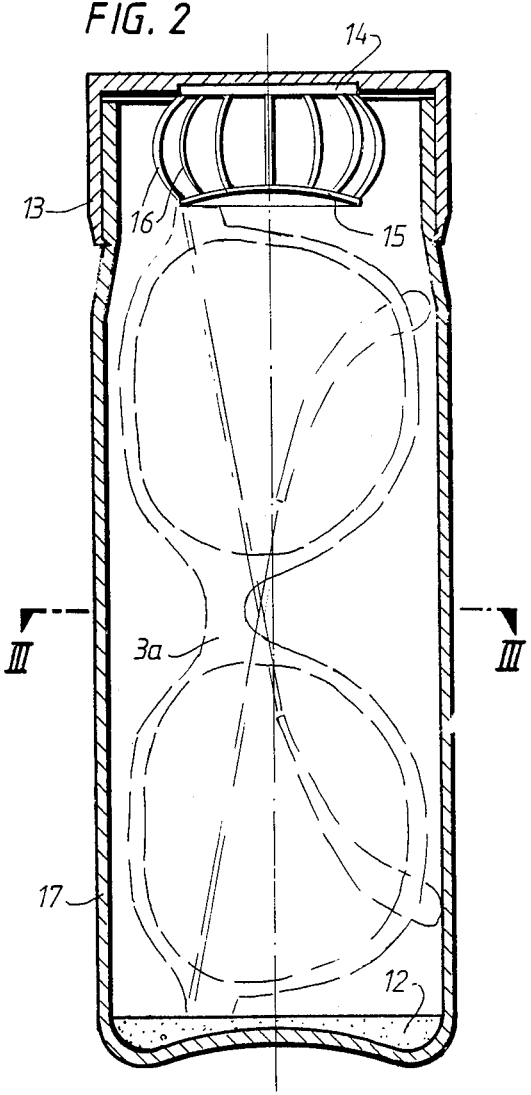
FIG. 2 is a modified embodiment of a cleaning receptacle also shown in vertical section.

In the embodiment disclosed in FIG. 2, insert 10 with its recess 11 is replaced by a flat disk 12 of foam material, while a top holder, inserted in cover 13, is configured to be cage-like. An upper base plate 14 is introduced into the cover 13, which may be secured thereto by glue, epoxy or other appropriate adhesive material. The top holder comprises a curved holder plate 15 and resilient rods 16.

Figure 3:
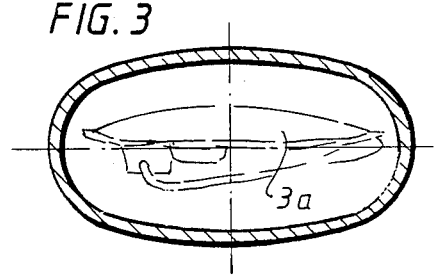
FIG. 3 is a horizontal section through FIG. 2, taken along the line III—III of FIG. 2.

The horizontal section of the cleaning receptacle according to the invention can be circular or some other appropriate configuration. In FIG. 3, the section of vessel 17 is oval and is shaped so that a pair of spectacles 3a is retained perpendicularly essentially between the resilient rods 16 and the bottom 12 so that the frame of the glasses is disposed with its wider dimension generally parallel to the longer axis of the oval. In this embodiment, cover 13 is either a lid or a cap clamp. The oval shape, with substantially identical cleaning effect as if the vessel 17 were cylindrical, requires less cleaning fluid and also it is an easier receptacle to place in a drawer or pocket than is a cylindrical receptacle. On the other hand, the round configuration avoids dispositions wherein the delicate plastic and/or nonreflective glasses lenses are more likely to scrape the container's walls upon introduction into or removal from the vessels involved.

The configuration shown in FIG. 4 is developed from that shown in FIG. 3, and sides 18 and 20 of vessel 19 define an elongated channel or "D" shaped (in horizontal cross-section) space 20' and a similar opposed shape which extend over the entire or almost the entire length of vessel 19. A pair of glasses held therein are thus prevented from tilting so lenses touch the sides when frames are used as shown.

The configuration of FIG. 5 combines the outer peripheries of two ovals or ellipses 21 and 22, of different sizes, which are at a right angle to each other, so that a larger pair of spectacles, such as sunglasses can be conveniently received by the larger oval 21 with the longer axis 21'. A smaller pair of glasses, e.g. half-glasses or children's glasses, can be conveniently received in the smaller oval 22 with the shorter axis 22'.

FIG. 6 shows a container 23 wherein the bottom insert 10 has been eliminated. A cup-shaped depression is molded during the production of container 23, for example by blowing or deep-drawing and formed by the bottom wall. The top holder is a bellows 27 which is resiliently and securely held by an annular flange 26 which forms an integral part of cover 25. Bellows 27 is adaptable to retain, within relatively wide limits, different sizes of spectacles.

Cleaning receptacle 35 of FIG. 7 does not have top holder, but rather is provided with a suitably outwardly curved cap 28 serving as a cover. Fastened to the bottom of receptacle 35 is a holder in the form of a bellows 29 which has an upper concave area 3. Bellows 29 includes a fastening member 31 resiliently fitted into annular flange 32 of a bottom disk 33, which is pressed into and thus affixed to an annular stiffening and reinforcing member 34 on the bottom of vessel 35.

The above embodiments function optimally for their purpose. It will be appreciated that a number of the elements are interchangeable. For example, identical or similar holders can be provided in the cover and the base, or holders disclosed for a certain receptacle may also be used in receptacles of different configurations. This is not to suggest, however, that the various holders disclosed herein are functionally equivalent in all respects.

In use, the spectacles are introduced into the disclosed receptacles which are each filled with a cleaning fluid and left in there for a certain length of time, both lenses being immersed in the fluid. If simultaneous inversion is not possible because insufficient cleaning fluid remains in the receptacle, it can be turned over on the receptacle lid for a period of time, so that both lenses are submerged one after the other and are thus cleaned by the fluid, or the cleaning can be accomplished by shaking or appropriately turning the receptacle.

Although the drawings are reasonably accurate depictions of the various embodiments, the disclosure herein is for clearness of understanding only and unnecessary limitations should not be implied therefrom to the prejudice of appropriate patent coverage, considering the inventive concepts and as defined by the following claims.

Having disclosed my invention, what I claim as new and to be secured by Letters Patent of the United States is:

1. A cleaning receptacle for spectacles, comprising:
   a cleaning vessel having a closed end and an open end;
   a cover, said cover being such that it sealably fits over said open end of said cleaning vessel and is thereby capable of retaining liquid within the receptacle without spillage or leakage; and
   at least one holder for holding spectacles said holder being internally and centrally mounted in said closed end of said cleaning vessel or in said cover and being adapted to receive and to retain, in cooperation with the inner surface of an opposing end of the cleaning receptacle, spectacles of different lengths along the lengths of the spectacles such that the lenses of the spectacles do not touch a wall portion of said cleaning vessel.

2. A cleaning receptacle according to claim 1, wherein said holder is composed of elastic material.

3. A cleaning receptacle according to claim 1 wherein said holder is secured to the middle of the inside of said cover by an adhesive material.

4. A cleaning receptacle according to claim 1 wherein said holder is welded to the middle of the inside of said cover.

5. A cleaning receptacle according to claim 1 wherein said holder is cylindrical.

6. A cleaning receptacle according to claim 1 wherein said holder comprises a cage-like structure.

7. A cleaning receptacle according to claim 1 wherein said holder comprises a bellows.

8. A cleaning receptacle according to claim 1 wherein the horizontal cross-section of said vessel is circular.

9. A cleaning receptacle according to claim 1 wherein the horizontal cross-section of said vessel is oval.

10. A cleaning receptacle according to claim 1 wherein said vessel is generally oval in cross-section and has a "D" shaped channel space extending outwardly on at least one of said vessel's wider sides.

11. A cleaning receptacle for spectacles, comprising:
    a cleaning vessel having a closed end and an open end;
    a cover, said cover being such that is sealably fits over said open end of said cleaning vessel and is thereby capable of retaining liquid within the receptacle without spillage or leakage; and
    at least one holder for holding the spectacles, wherein said holder comprises the bottom of said vessel, is cup shaped and is adapted to receive and to retain, in cooperation with the inner surface of said cover, spectacles of different lengths along the individual lengths of the spectacles such that the lenses of the spectacles do not touch a wall portion of said cleaning vessel.

12. A cleaning receptacle for spectacles, comprising:
    a cleaning vessel having a closed end and an open end;
    a cover, said cover being such that it sealably fits over said open end of said cleaning vessel and is thereby capable of retaining liquid within the receptacle without spillage or leakage;
    at least one holder for holding the spectacles, wherein said cover is provided on its inside with securing means for resiliently receiving and retaining, said holder in a relatively central position.

13. A cleaning receptacle according to claim 12, wherein the central area of said holder on the bottom of said cover is concave.

14. A cleaning receptacle for spectacles, comprising:
    a cleaning vessel having a closed end and an open end, wherein the horizontal cross-section of said vessel conforms to the outer periphery formed by two ovals which cross each other;
    a cover, said cover being such that is sealably fits over said open end of said cleaning vessel and is thereby capable of retaining liquid within the receptacle without spillage or leakage; and
    at least one holder for holding the spectacles, said holder being internally and centrally mounted in said closed end of said cleaning vessel or said cover and being adapted to receive and to retain, in cooperation with the inner surface of an opposing end of the cleaning receptacle, spectacles of different lengths along such spectacles' lengths so that the spectacles' lenses of the respective spectacles placed therein are completely spaced from the interior walls of said cleaning vessel.

15. A cleaning receptacle according to claim 14 wherein the longer horizontal axes of each of said two ovals cross each other at substantially right angles.

* * * * *